United States Patent
Childress et al.

(10) Patent No.: US 8,224,937 B2
(45) Date of Patent: Jul. 17, 2012

(54) EVENT OWNERSHIP ASSIGNER WITH FAILOVER FOR MULTIPLE EVENT SERVER SYSTEM

(75) Inventors: Rhonda L. Childress, Austin, TX (US); John E. Dinger, Cary, NC (US); Neil Raymond Pennell, Cedar Creek, TX (US); James Daniel Wiggins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 10/793,458

(22) Filed: Mar. 4, 2004

(65) Prior Publication Data

US 2005/0198273 A1    Sep. 8, 2005

(51) Int. Cl.
  G06F 15/173  (2006.01)
  G06F 9/46    (2006.01)
  G06F 13/00   (2006.01)
(52) U.S. Cl. .................. 709/223; 709/224; 719/318
(58) Field of Classification Search .......... 709/223, 709/224; 719/318
  See application file for complete search history.

(56) References Cited

U.S. PATENT DOCUMENTS

| | | | |
|---|---|---|---|
| 5,692,120 A | 11/1997 | Forman et al. | |
| 5,797,128 A | 8/1998 | Birnbaum | |
| 5,872,928 A | 2/1999 | Lewis et al. | |
| 5,887,141 A | 3/1999 | Trugman et al. | 395/200.57 |
| 5,941,996 A | 8/1999 | Smith et al. | |
| 6,094,681 A * | 7/2000 | Shaffer et al. | 709/224 |
| 6,108,701 A | 8/2000 | Davies et al. | 709/224 |
| 6,141,759 A * | 10/2000 | Braddy | 726/14 |
| 6,151,684 A * | 11/2000 | Alexander et al. | 714/4 |
| 6,223,149 B1 | 4/2001 | Margulis et al. | 703/27 |
| 6,253,230 B1 | 6/2001 | Couland et al. | 709/203 |
| 6,418,468 B1 | 7/2002 | Ahlstrom et al. | |

(Continued)

FOREIGN PATENT DOCUMENTS

JP    07-334444    12/1995

(Continued)

OTHER PUBLICATIONS

Berkeley; "Managing Application Services over Service Provider Networks:Architecture and Dependency Analysis"; G. Kar, A. Keller, S. Calo, IBM T.J. Watson Research Center, pp. 1-14, retrieved on Jan. 23, 2012 from www.cs.berkeley.edu/~yelick/294/papers/NOMS2000Final.pdf (we believe this is the best available copy); Originally found Managing Application Services over Service Provider Networks: Architecture and Dependency Analysis, G.Kar, A. Keller, S. Calo, IEEE Conference Proceedings Article, Apr. 10, 2000, pp. 61-74.

(Continued)

*Primary Examiner* — Greg C Bengzon
*Assistant Examiner* — Muktesh G Gupta
(74) *Attorney, Agent, or Firm* — Robert H. Frantz; Jeffrey S. LaBaw (57) ABSTRACT

Event reports generated from multiple event sources within an event management system such as Tivoli (TM) Event Console are handled by an Event Bus, which links multiple problem resolution servers together and assigns an ownership to each event report. The Event Bus parses each incoming event for adding or altering a slot value. Based on the slot value, the event is forwarded to the configured event servers. In addition, the ability to dynamically change ownership to maintain an error-free systematic transmission flow is provided.

36 Claims, 10 Drawing Sheets

U.S. PATENT DOCUMENTS

| | | | |
|---|---|---|---|
| 6,449,588 B1 | 9/2002 | Bowman-Amuah | |
| 6,473,407 B1 * | 10/2002 | Ditmer et al. | 370/252 |
| 6,536,000 B1 * | 3/2003 | Jackson et al. | 714/57 |
| 6,571,285 B1 | 5/2003 | Groath et al. | |
| 6,654,782 B1 * | 11/2003 | O'Brien et al. | 709/201 |
| 6,718,376 B1 | 4/2004 | Chu et al. | |
| 6,718,481 B1 | 4/2004 | Fair | |
| 6,829,639 B1 | 12/2004 | Lawson et al. | |
| 6,845,474 B2 | 1/2005 | Circenis et al. | |
| 6,918,124 B1 * | 7/2005 | Novik et al. | 719/318 |
| 7,010,588 B2 * | 3/2006 | Martin et al. | 709/223 |
| 7,246,156 B2 * | 7/2007 | Ginter et al. | 709/217 |
| 7,376,969 B1 * | 5/2008 | Njemanze et al. | 726/22 |
| 7,379,999 B1 * | 5/2008 | Zhou et al. | 709/224 |
| 7,398,530 B1 * | 7/2008 | Parla et al. | 719/318 |
| 7,412,502 B2 * | 8/2008 | Fearn et al. | 709/223 |
| 7,529,981 B2 | 5/2009 | Childress et al. | |
| 7,992,033 B2 | 8/2011 | Childress et al. | |
| 2001/0049717 A1 * | 12/2001 | Freeman et al. | 709/203 |
| 2002/0010803 A1 | 1/2002 | Oberstein et al. | 709/318 |
| 2002/0107743 A1 | 8/2002 | Sagawa | |
| 2002/0116248 A1 | 8/2002 | Amit et al. | 705/9 |
| 2002/0138571 A1 * | 9/2002 | Trinon et al. | 709/204 |
| 2003/0005107 A1 | 1/2003 | Dulberg et al. | |
| 2003/0014462 A1 * | 1/2003 | Bennett et al. | 709/100 |
| 2003/0023719 A1 | 1/2003 | Castelli et al. | |
| 2003/0046396 A1 | 3/2003 | Richter et al. | |
| 2003/0229688 A1 | 12/2003 | Liang | 709/223 |
| 2004/0003080 A1 | 1/2004 | Huff | 709/225 |
| 2004/0030775 A1 | 2/2004 | Lauzon et al. | 709/224 |
| 2004/0210889 A1 | 10/2004 | Childress et al. | |
| 2005/0010821 A1 * | 1/2005 | Cooper et al. | 713/201 |
| 2005/0015777 A1 | 1/2005 | Liss et al. | 719/318 |
| 2005/0022210 A1 * | 1/2005 | Zintel et al. | 719/318 |
| 2006/0117212 A1 | 6/2006 | Meyer et al. | |
| 2009/0183024 A1 | 7/2009 | Childress et al. | |

FOREIGN PATENT DOCUMENTS

| | | |
|---|---|---|
| JP | 11-096248 | 4/1999 |
| JP | 2001-154884 | 6/2001 |
| JP | 2001-222574 | 8/2001 |
| JP | 2003-044321 | 2/2003 |
| JP | 2001-361211 | 6/2003 |

OTHER PUBLICATIONS

USPTO; examination correspondendence from related U.S. Appl. No. 10/418,565, now issued as U.S. patent 7,529,981.

USPTO; examination correspondendence from related U.S. Appl. No. 12/413,020, now issued as U.S. patent 7,992,033.

PCT: International Search Report from related international patent application PCT/GB2004/001664, fi iiled on Apr. 16, 2004.

* cited by examiner

EVENT OWNERSHIP ASSIGNER WITH FAILOVER FOR MULTIPLE EVENT SERVER SYSTEM

BACKGROUND OF THE INVENTION

1. Field of the Invention

This invention relates to circuits, systems, and methods for handling electronically reported events in a computing environment such as failure reports from a managed networked computer.

2. Description of the Related Art

In today's business environment, employee productivity and customer satisfaction can be negatively impacted from system failures and delays. In order to achieve high performance, system flaw must be diagnosed and resolved in a timely manner. With highly interconnected systems, the level of complexity in problem resolution is considerable. Frequently, multiple administrators and support staff will receive identical problem notifications, which creates duplicate work, and often compromises work flow effectiveness, system response, and productivity.

A situation which commonly arises in the Systems Management arena in large accounts (e.g. computer systems for very large retail stores, government agencies, etc.) is the flow of events from multiple locations to multiple "home" servers, which are assigned various tasks based upon their defined tasks. Two of the main requirements encountered in this environment are (a) the need for the events to be sent to multiple event servers, and (b) to provide "failover" capabilities.

To date, the standard solution has been to have the events sent to different servers based upon 'rules' or logic defined either at the source of the event, or part of the infrastructure of the system at a low level. This causes several problems, the first being the assumption that the network infrastructure can handle the often 4 to 5 times load required. Secondly, the event ownership and failover scheme, along with the hardware needed to power this logic, needs to be coordinated among lower level parts of the infrastructure at many points, often including different geographies with many different locations, making system configuration and deployment difficult.

Therefore, in order to have technologies integrated with optimal configuration, today's network computing enterprise requires an open, scalable and cross-platform approach. One such system solution is IBM's Tivoli (TM) Management Framework ("TMF"), which is the basis for a suite of management applications for complex computing system and network management. TMF has the following features and services:

(a) enables users to create and execute tasks on multiple Tivoli resources via a task library;
(b) provides a scheduler to run the task library;
(c) includes a Relational Data Base Management System ("RDBMS") Interface Module (RIM) that allows other Tivoli products to write application-specific information to relational databases; and
(d) incorporates a query capability that allows users to search and retrieve data from a relational database.

Another tool that works well with TMF is IBM's TivoliEnterprise Console ("TEC"). TEC is a sophisticated, highly automated problem diagnosis and resolution tool aimed to improve system performance and reduce support costs. TEC is a rule-based event management application that integrates system, database, network, and application management. TEC has the ability to collect, process and automatically respond to common management events such as server failure, lost network connection or a successful completed batch processing job. Each TEC acts as a central collection point for alerts and events from various sources, prioritizing tasks based on the level of severity of received events, filtering redundant or low-priority events. TEC's coordination functionality also helps identify the reviewer to process specific events to resolve issues quickly.

IBM's Tivoli Management Framework serves as the foundation for Tivoli Enterprise Console. By utilizing the framework and console together, one can manage large distributed networks with multiple operating systems, which can use different network services performing diverse system operations that can change nodes and users constantly.

Figure 3:
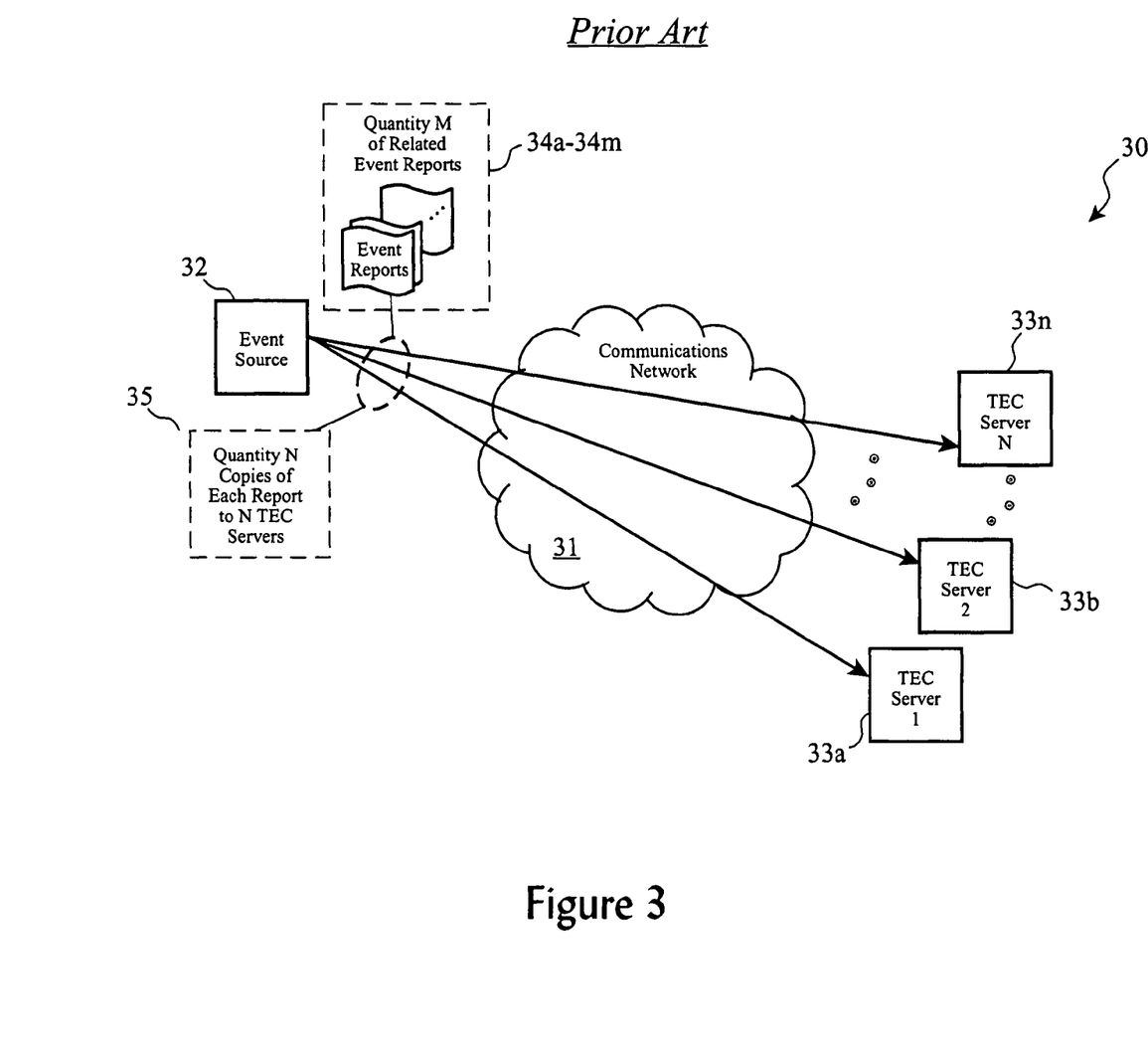
FIG. 3 illustrates the current process method for an event report within the TEC environment.

In order to understand TEC's existing processes, we turn now to FIG. 3. In this illustration of a typical event process (30), a number M of event reports (34a-34m) are generated by various a single event source (32) related to a single failure. For example, if a system's printer is out of paper, a first event report may be generated by an application program which is attempting to print a document, a second event report may be generated by the operating system of that system when it discovers the printer is off-line or not communicating, a third event report may be generated by the printer management application program, etc.

Based on the configuration of the system (32), a copy of each of the M related event reports is transmitted via a communications network (31), such as a dial-up modem with a telephone network, to one or more specified TEC servers (33a, 33b, 33n). These multiple copies of multiple event reports (e.g. M×n) are transmitted in an effort to assure that at least one TEC server successfully receives and acts on the failure. While this increases the reliability of the response system, these duplicate reports create redundant data and duplicate effort.

Figure 4:
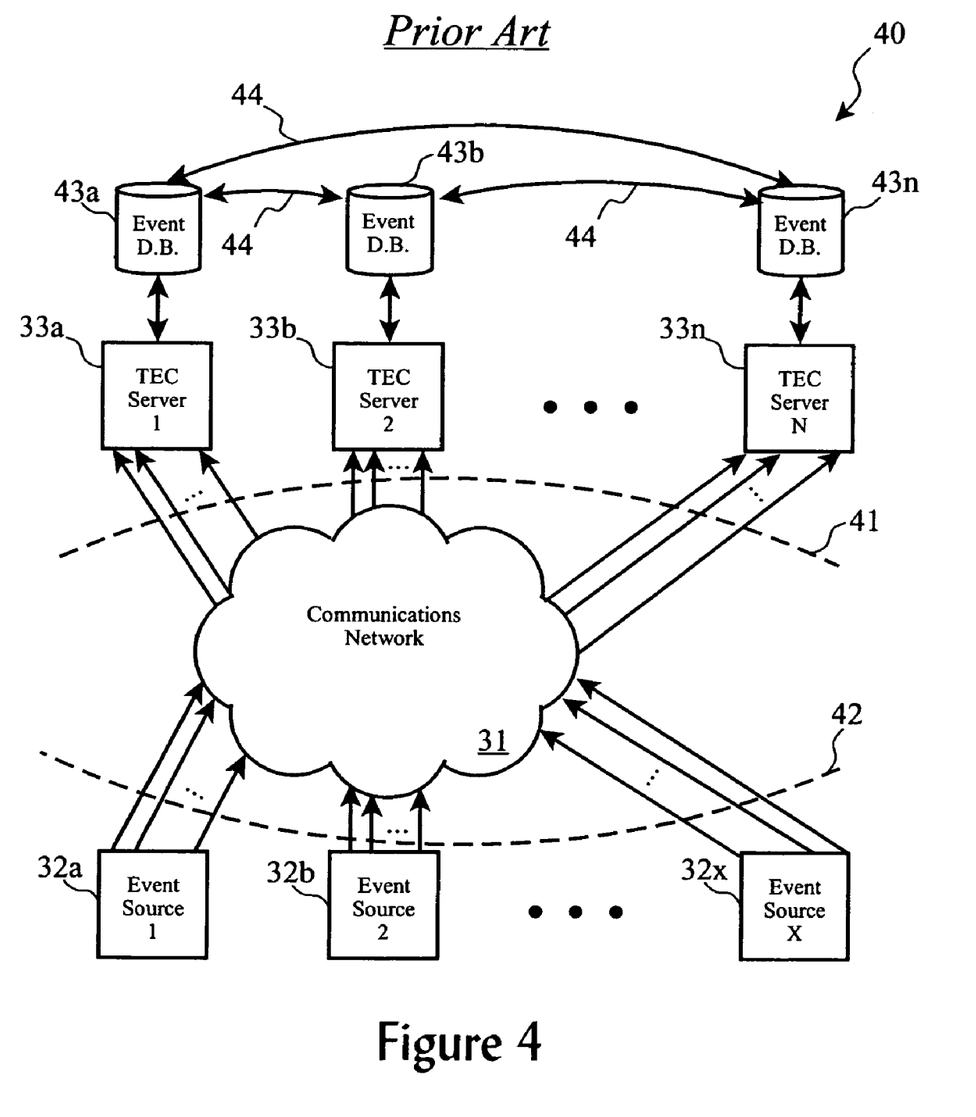
FIG. 4 shows how data is stored under the current infrastructure environment.

Turning to FIG. 4, a wider system view of typical handling of event reports is shown, wherein each TEC server receives event reports from a plurality of even sources. In this illustration (40), multiple event reports (42) from multiple event sources (32a, 32b, . . . 32x) are sent via the communications network (31), and are received (41) by multiple TEC servers (33a-33n), including the duplicate reports discussed in conjunction with FIG. 3. So, for example in this wider illustration, a total of M×n×x event reports are transmitted between event sources and TEC servers.

Once each event report reaches a particular TEC server, appropriate data is stored in a local event database (43a, 43b, . . . 43n). Using a distributed relational database synchronization product such as IBM's Lotus Notes (TM) and/or Domino (TM) products, the TEC server databases periodically synchronized (44) with each other based on predefined rules and time periods.

For example, event report A (not shown) is generated from event source (32x), and copies are sent to TEC servers 1 and 2 (33a, 33b). When it is received by TEC Server 1 (33a), it is immediately stored in TEC server 1's local database (43a). Likewise, when event report A from event source (32x) is received by TEC Server 2 (33b), it is immediately stored in TEC server 2's local database (43b). At this point, neither TEC server is aware that the other has received a copy of the event report, until the next database synchronization (44) occurs, such as minutes, hours or even days later, depending on the database synchronization schedule rules, availability of a network resource for the database synchronization process, and amount of data to be synchronized. Following the next synchronization process, TEC servers 1 and 2 are to be notified whether or not event report A is resolved by another TEC server. If not, then it may fall to the local personnel to resolve the problem as a backup resource for supporting the reporting event source system.

Because database synchronization is not immediate (e.g. not "realtime"), an event report may not be addressed by other backup TEC servers until after at least one synchronization period has elapsed. Further, each event source may be configured to report events to multiple TEC servers, such as 3, 4 or more TEC servers, which also implies update and synchronization delays with each of their databases before a particular TEC server would be aware that resolution of the problem falls to it and not another one of the servers.

Consequently, an extended delay in response time occurs which is an undesirable characteristic of the current processes. Further, as multiple copies of the same event reports are sent to multiple TEC servers simultaneously, the system stores duplicate data which can create redundant support effort in an attempt to reduce delays to resolving the problem(s). For example, if TEC Server 3 is defined as the second backup to TEC Server 2, which is the first backup to TEC Server 1 for a particular event source, and if technicians learn by experience that it may take up to 2 hours for the system to determine that neither TEC Server 1 or 2 are addressing a reported problem, then technicians associated with TEC Server 3 may be dispatched to resolve a problem prior to actual notification that TEC Servers 1 and 2 are not addressing the problem in anticipation of a 2 hour undesired delay. If, however, TEC Server 1 or 2 have begun to address the problem (e.g. a technician or software resolution process has been initiated), the effort of TEC Server 3 will be redundant, wasteful, and often confusing to the situation.

For these reasons, there exists a need in the art for a system and method which addresses reported events in a timely manner, maintains a system of backup servers, and deals with duplicate event reports while avoiding duplication of problem resolution efforts and confusion surrounding responsibility for problem resolution.

Additionally, there exists a need in the art for a system and method which provides real-time event synchronization between multiple event servers in order to respond to event reports immediately. Furthermore, there exists a need in the art to eliminate duplicate support efforts to reduce time and energy spent for cost saving purposes.

BRIEF DESCRIPTION OF THE DRAWINGS

The following detailed description when taken in conjunction with the figures presented herein present a complete description of the present invention.

SUMMARY OF THE INVENTION

The present invention, referred to as TEC Event Sync ("TEvS"), provides a unique method to process reported events generated from multiple event sources within an event management system such as Tivoli (TM) Event Console ("TEC"), or with similar systems, products and tools.

TEvS provides an Event Bus, which links multiple TEC servers together and assigns an ownership to each report. TEvS preferably provides a set of TEvS modules deployed among multiple TEC servers to implement the Event Bus. The TEvS module parses each incoming event for adding or altering a slot value. Based on the slot value, the event is forwarded to the configured event servers. In addition, an enhanced embodiment has the ability to dynamically change ownership to maintain an error-free systematic transmission flow.

In another enhancement of the present invention, administrators or support staff have the ability to summarize event flood, calculate event statistics, and log or cache events. Furthermore, if a server or module fails, the sources would rollover to a secondary server or module to continue the process. In the scenario where an owner is not designated, a slot value will be added or assigned to prompt the delegated server to act accordingly.

One preferred embodiment adheres to TEC's rule-based framework for specific implementation with TEC and TMF. The logical flow is a set of guidelines succinctly declared where TEC rules engine conducts an examination and verification during the process.

As such, the invention is highly useful and easy to manage, allowing effective and quicker response time to any system failure.

DETAILED DESCRIPTION OF THE INVENTION

The present invention, Tech Event Synchronization ("TEvS") provides a unique method to process reported events generated from multiple event sources within an event management system such as Tivoli (TM) Event Console ("TEC") with the Tivoli (TM) Management Framework ("TMF"). However, it will be recognized by those skilled in the art that the present invention is not limited to realization with TEC/TMF, but may alternately be realized in conjunction with many other similar systems, products and tools. As our disclosure herein provides illustrative embodiments of the present invention relative to realization with TEC, it will be within the skill in the art to adapt the present invention to other products and platforms without departing from the scope of the present invention.

TEvS has been implemented in one embodiment as a JAVA application program independent of TEC, but may alternatively be implemented using any suitable programming language and methodology. The following definitions will be employed throughout this disclosure:

(a) "Real-time" shall mean of or relating to computer systems, processes and logic that produce their results at the essentially same rate as they receive data, without significant delay;

(b) "Resilient system" shall mean a system that can sustain (potentially self-inflicted) damage, process unexpected or illegal inputs and take incorrect actions, yet nevertheless continue to execute productively;

(c) "Roll-over" shall mean when one module malfunctions or terminates abnormally, the data received by the terminated module will be transmitted to the next available module for continued processing and handling;

(d) "Load-balancing" shall mean when a server is at its optimal processing state, any new system jobs will be redirected to the next available server to manage traffic and operate at maximum service quality;

(e) "Bottleneck" shall refer to the component or components that have a limiting factor on the system; and (f) "Slot" shall refer to a parameter with defined character limitation.

Computing Platform for TEvS

The present invention may be realized as a circuit, as a software-implemented process, or a combination of both. In one embodiment, the invention is realized as a feature or addition to software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 1:
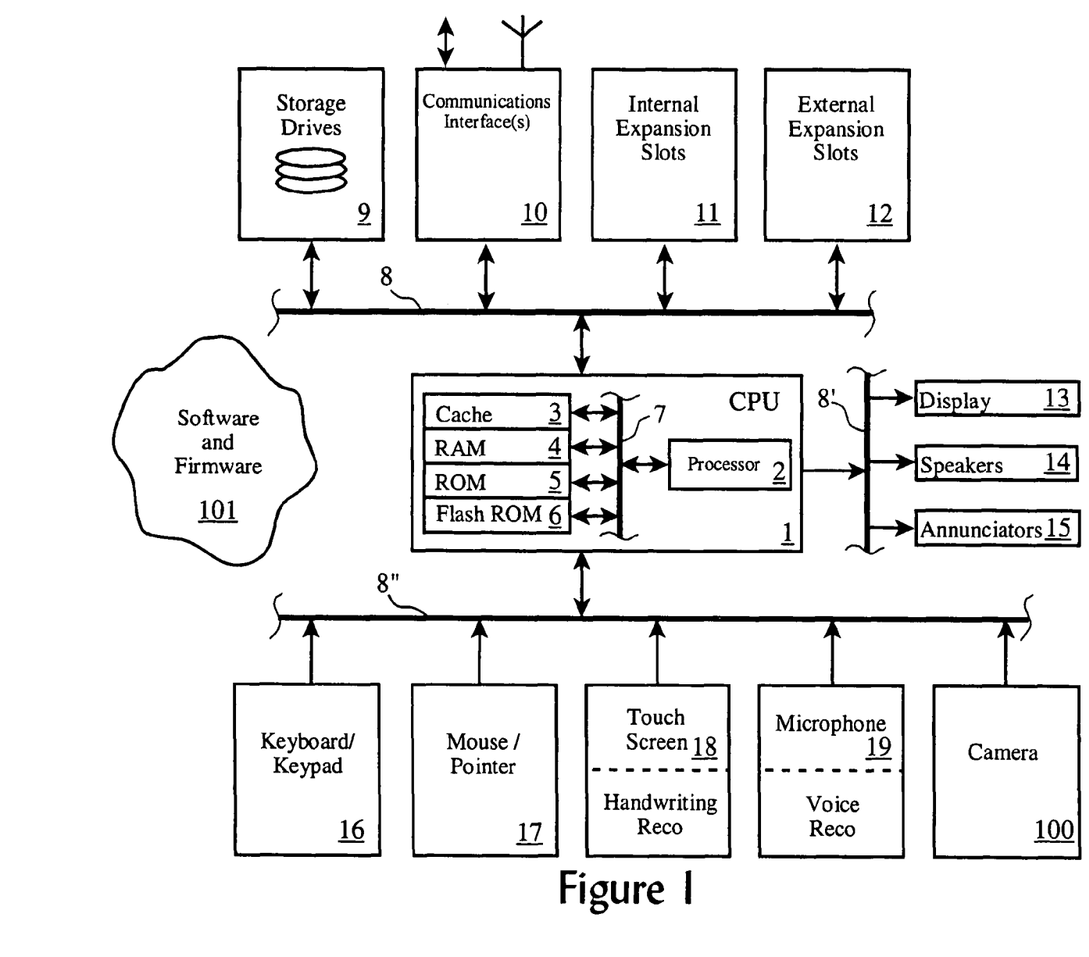
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA'S, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint [TM]. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc. The computing platform is also provided with one or more software and firmware (101) programs to implement the desired functionality of the computing platforms.

Figure 2:
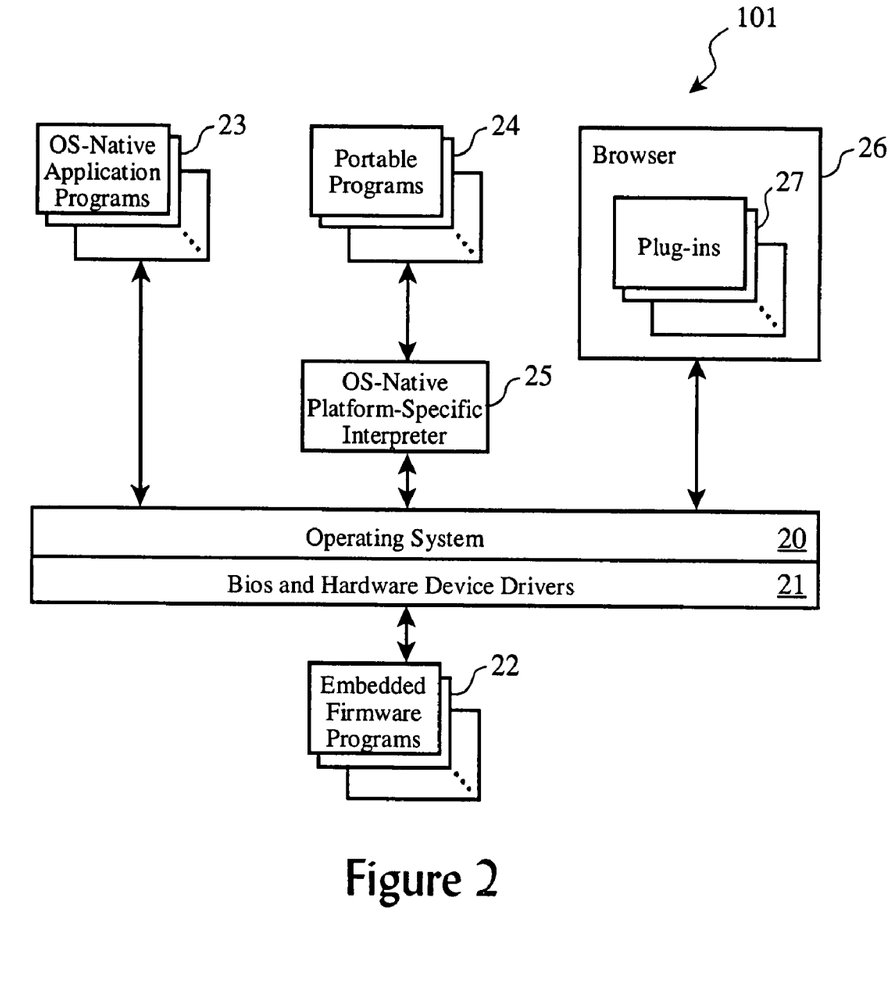
FIG. 2 shows a generalized organization of software and firmware associated with the generalized architecture of FIG. 1.

Turning now to FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java [TM] scripts and programs.

Often, computing platforms are also provided with a form of web browser or micro-browser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions (e.g. circuits), in part or in whole, without departing from the spirit and scope of the invention.

Logic of TEvS

Figure 5:
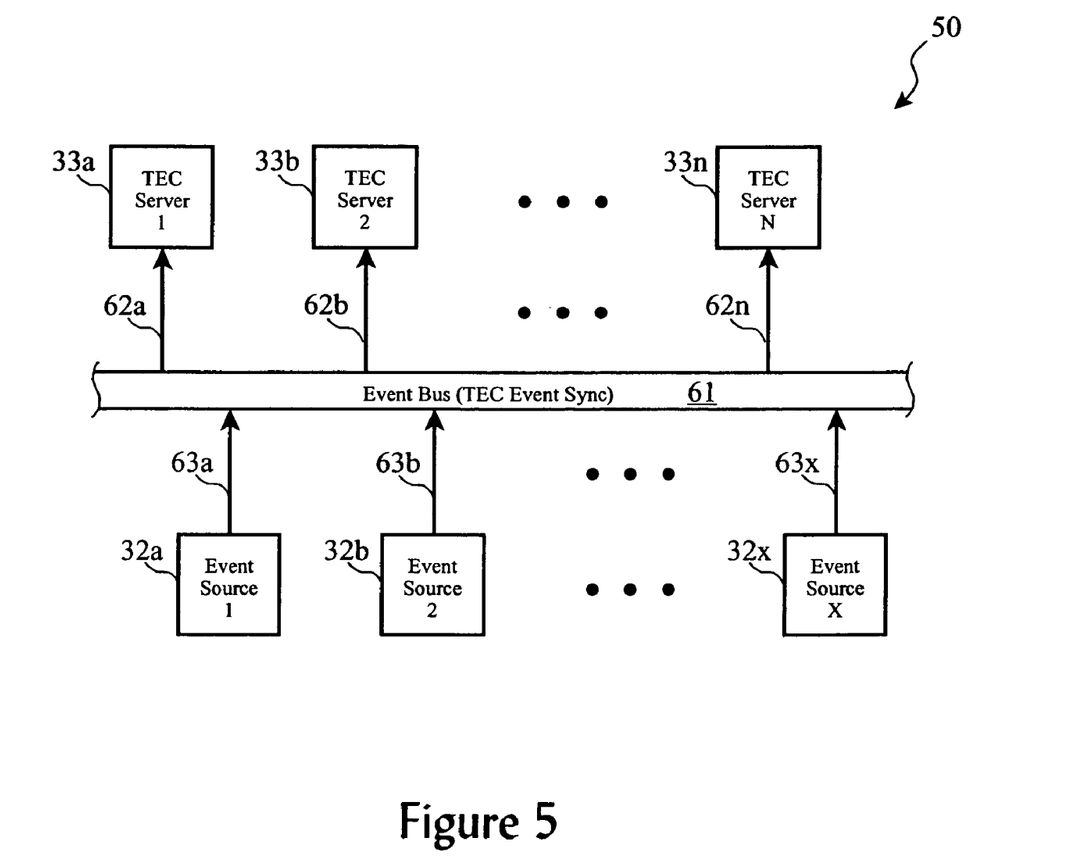
FIG. 5 depicts the functional arrangement of the present invention.

Turning now to FIG. 5, a functional illustration (50) of the invention is shown. The Event Bus (61), which contains one or more TEvS modules, intercepts event reports (63a-63x) from multiple event sources (32a-32x). In the TEvS module, event reports are (63a-63x) sorted, processed, flagged and forwarded in real-time to the appropriate TEC servers (33a-33n) based on each event's primary or secondary ownership.

Figure 6:
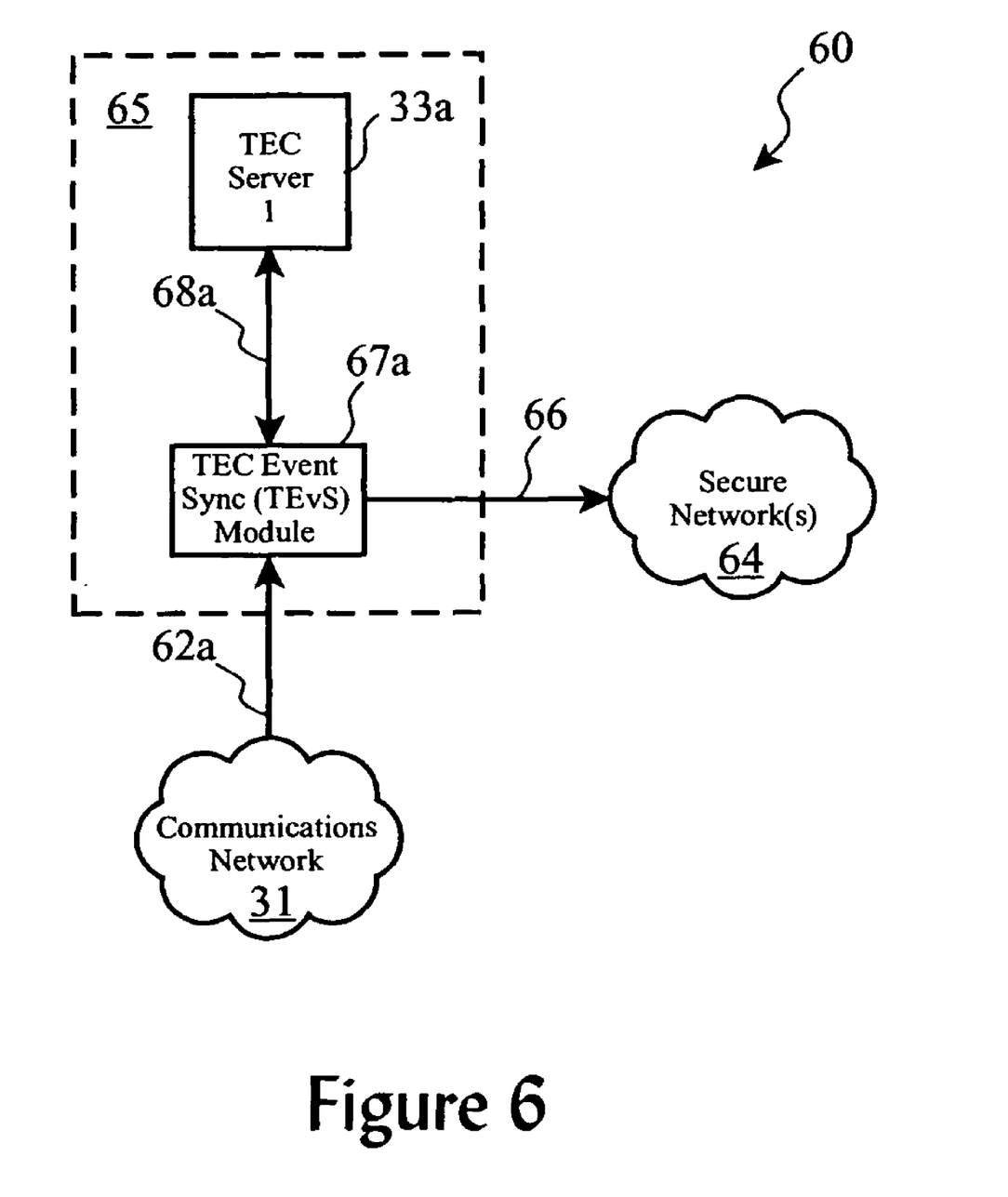
FIG. 6 provides a detailed illustration of the method in which event reports are processed.

FIG. 6 provides more details (60) of how a reported event is processed by TEvS. In this example, details of the TEvS processing in association (65) with TEC server 1 (33a) are shown. When an event occurs, an event report (62a) is received by TEC server 1 from the event source via the communications network (31), such as a dial-up modem connection. Communications adapters can include modems for wired dial-up connections, Ethernet (IEEE 802.3) adapters for local area networks (LAN) technology and wireless Ethernet specification such as IEEE 802.11. Rather than allowing each reported event to proceed directly to the TEC server, however, the TEvS module (67a) intercepts all event reports from the communication network (31). The event report (62a) is then flagged with ownership properties by the TEvS module (67a), and the modified event data is transmitted to the appropriate TEC servers (including TEC Server 1) for administrators to proceed appropriately.

By adding a primary ownership or secondary ownership designation to each propagated event report, and by propagating each modified event report in real-time on the Event Bus (rather than waiting for a database synchronization to occur), each TEC Server is immediately notified of new events and is made aware of whether or not it is necessary to react immediately.

For example, if event report B received is flagged with TEC server 1 (33a) as the primary owner, immediately following, modified event report B' is passed (68a) onto TEC server (33a), while nearly simultaneously, copies of the modified event report B' is propagated (66) to one or more backup servers, preferably via one or more secured or high availability networks (64). The secured network (64) utilized for propagation of the modified event reports, referred to as "synch'ed event reports", may include but not be limited to a virtual private network ("VPN"), a microwave relay, and Internet backbones that provide security and reliability. In an alternate embodiment, the communication network (31) is a lower level of a hierarchically organized network, and the secured network (64) is an upper or top level of the hierarchically organized network, wherein the TEC servers are top level servers, such as servers running on a high availability corporate network.

According to a preferred embodiment, a TEvS module (67a) is executed by or on the same computing platform as the TEC server (33a) for which it flags primary ownership (e.g. "local" processing). Alternatively, a TEvS module may be executed on a remote computing platform, or its logic may be implemented in programmable or hard logic or circuits, or a combination thereof.

Figure 7:
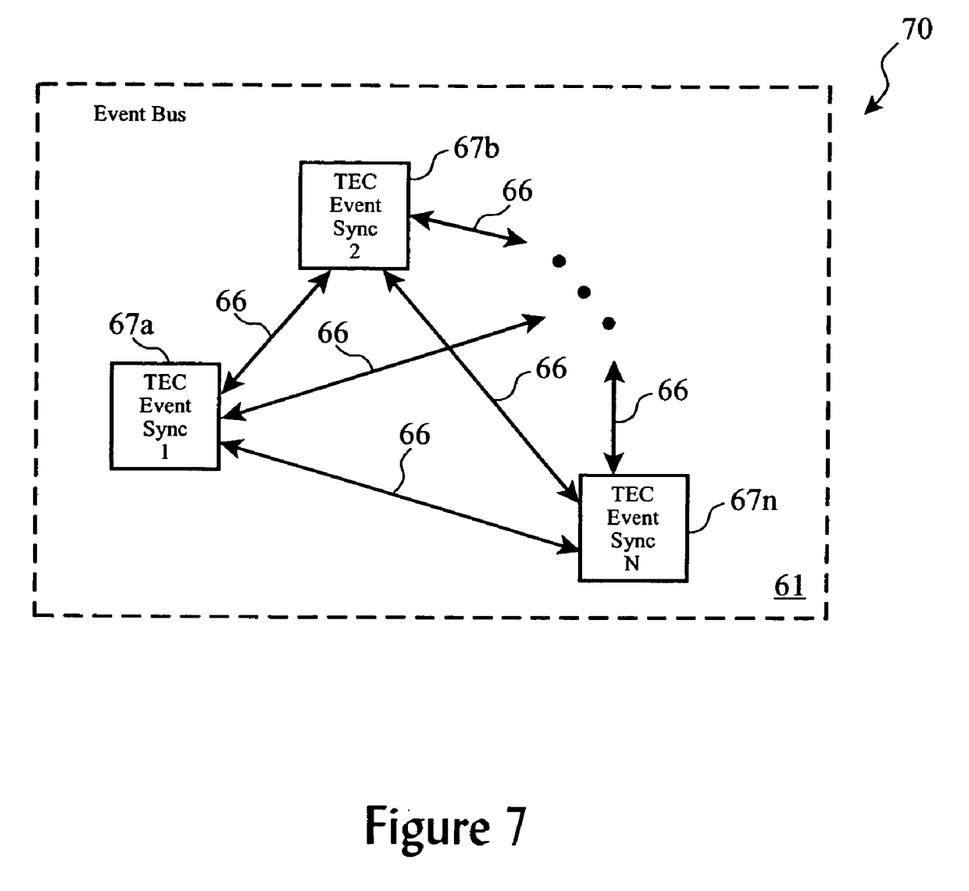
FIG. 7 demonstrates the autonomy between TEvS modules.

TEvS modules (67a, 67b, . . . 67n) operate independently from each other in order to handle event reports generated, as shown in FIG. 7. The modules have the ability to autonomously communicate (66) with each other via the secured network, previously described. One TEC server can have multiple TEvS modules receiving event reports to be processed. Therefore, if a module fails or is overloaded and becomes a bottleneck, it does not adversely affect another module's function and event reports will continue to be transmitted. The set (61) of TEvS modules (67a, 67b, . . . 67n) define and implement the Event Bus, also previously described, and can be widely distributed among a plurality of TEC servers, or may be partially or wholly consolidated into fewer actual logical implementations.

Figure 8:
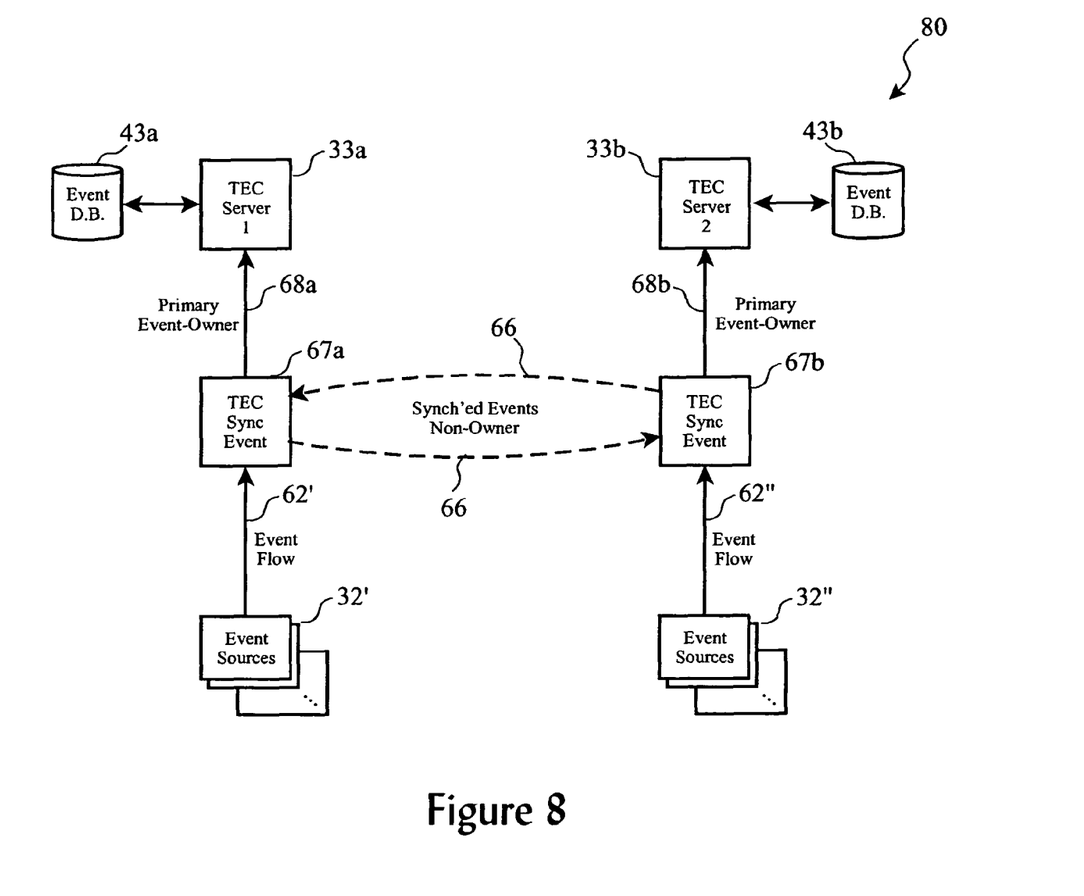
FIG. 8 provides a wider view of system operations according to the present invention.

FIG. 8 provides an alternate perspective (80) of how event reports are handled according to the invention. Event reports which are generated from the event sources (32', 32") constitute an event flow (62', 62") from sets of event sources (32', 32") to the TEvS modules (67a-67n) of the Event Bus. After the TEvS modules (67a-67n) process the event flow (32', 32") to properly flag each event with a primary owner, synch'ed events (66) are exchanged on the Event Bus (e.g. between TEvS modules), and passed (68a, 68b, etc.) on to the primary owner TEC servers, as well. Once the modified event reports reach the TEC servers, the data is stored in separate, local databases (43a, 43b). Through use of the present invention, however, the databases do not need to be periodically synchronized to verify whether an event report is handled by the proper administrator, as they are always kept up to date through the real-time Event Bus actions, which avoids the delayed response time of the previous TEC event handling processes, and eliminates redundancy in duplicated efforts by the TEC administrative staff.

Figure 9:
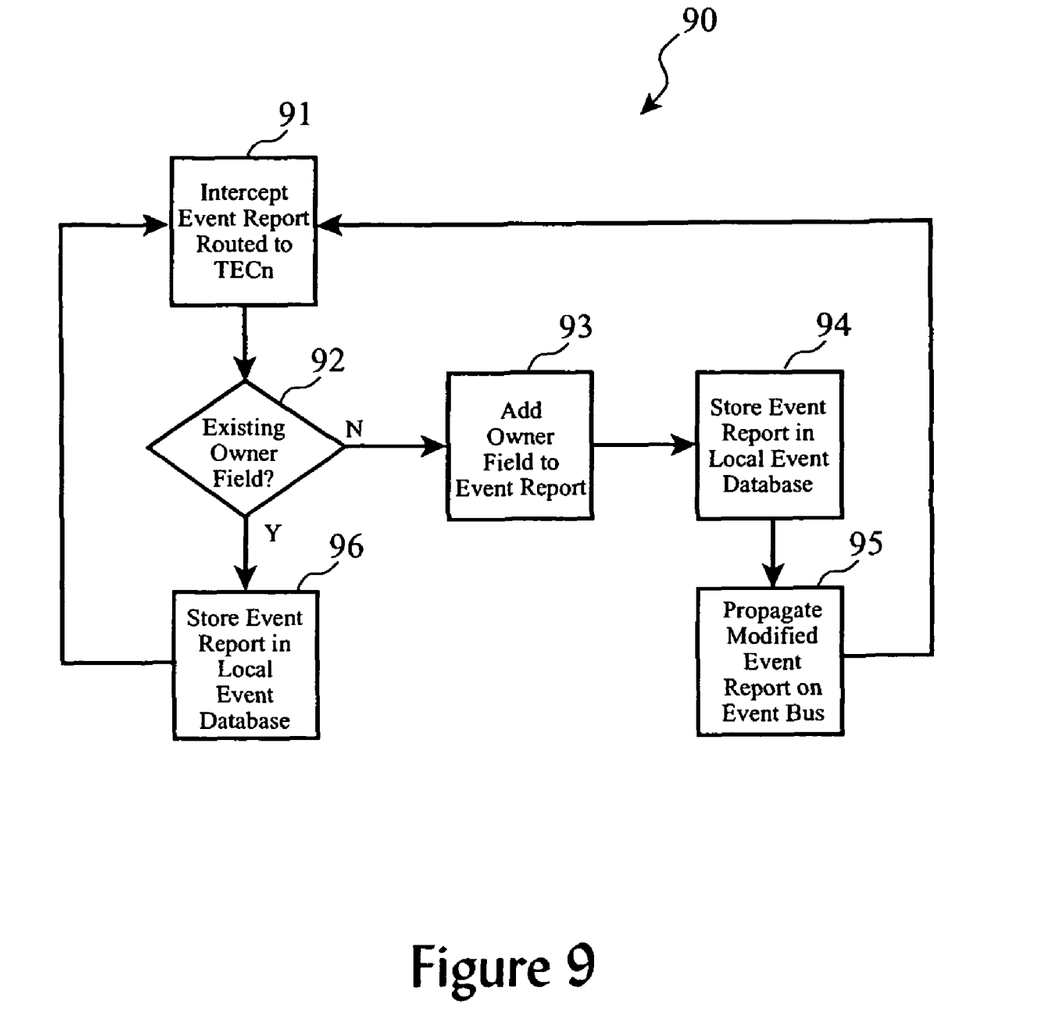
FIG. 9 sets forth a logical process of our new TEvS module.

Turning to FIG. 9, a logical process for a TEvS module is shown. When an event report is intercepted (91) by the Event Bus, the TEvS logic checks (92) for an existing ownership assignment within the event report (e.g. has the event report been previously modified according to the invention by another TEvS module?). If (92) an owner designation already exists in the event report, then the event report data is stored in the local event database (96) (or in the event database associated with the TEC server for which a module is handling event reports).

If (92) no owner designation exists in the event report (e.g. this is an unmodifed event report), then a rules base is consulted by the TEvS module to determine a primary owner, and an owner field is added (93) to the event report. According to the preferred embodiment, a TEC event report may be added by adding a "slot" in the report, and setting that slot's value to a value indicating which TEC server is the primary owner. In alternate embodiments in association with other management systems, the event report may be added by using specific language constructs, such as eXtensible Markup Language ("XML") fields, binary data values, or any other data construct suitable for the associated management system.

Figure 10:
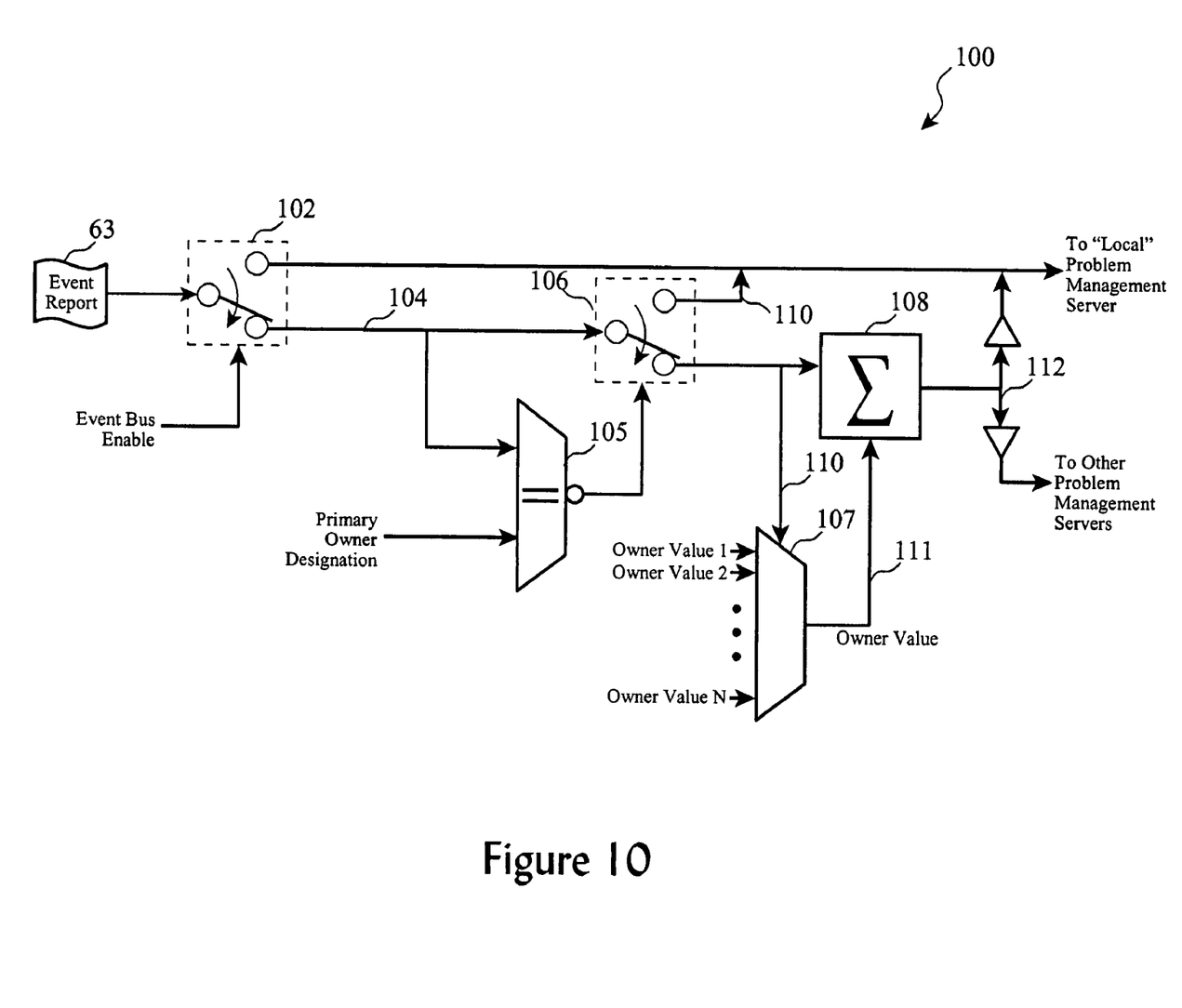
FIG. 10 provides a circuit embodiment diagram of the present invention.

FIG. 10 illustrates a system implementation of the present invention, which may be accomplished in whole or part by circuits and electronics, such as using programmable logic or through custom integrated circuits. An event report (63), such as a series of digital values representing binary, text, or character parameters, is received by the system (100) at an input selector switch (102), controlled by an event bus enable signal. When this signal is false (e.g. when the event bus is disabled or when an owner designation already exists in an event report), the input selector switch (102) directs the event report (63) data along a path to a local TEC server such that the data is propagated unmodified.

However, when the event bus enable signal is true (e.g. when an owner designation does not already exists in an event report and the event bus is enabled), the input selector switch (102) directs the event report (63) data along a path (104) to a comparator (105) which determines if a primary owner designation parameter is contained within the event report data (63). If the comparator detects the existence of a primary owner designation parameter, an output selector switch (106) control signal is activated such that the data is directed along a path (110) to output the unmodified event report data to a local TEC server.

If the comparator does not detect existence of a primary owner designation parameter in the event report data, then output selector switch (106) control signal is activated such that the event report data is presented to a data selector (107) which implements logical owner selection rules, and provides an owner indication value (111) to a summation circuit (108). The summation circuit (108) also receives the event report data from the output selector switch (106), and combines the owner indication value (111) with the event report data to produce a modified event report data including an owner designation parameter. This modified event report data from the summation circuit (107) is then transmitted to a local TEC server, and to one or more alternate TEC servers, preferably through a buffering or one-way data transmission device.

Conclusion

The present invention has been described in general terms and by use of illustrative example embodiments. It is within the skill of those in the art to make certain alterations and modifications, such as programming language, computing platform, or implementation methodology, in order to realize an alternate embodiment of the invention for use with alternate management systems. Therefore, the scope of the present invention should be determined by the following claims.

What is claimed is:

1. A method for handling event reports in a problem management system comprising:
receiving by an event synchronizer an event report from an event source in a computing environment of managed networked computers, said event report having a series of digital values representing binary, text, or character parameters for a reported network computing enterprise single failure event;
responsive to determining by said event synchronizer that said event report contains a problem management server owner designation parameter, transmitting said received event report without modification to a local problem management server corresponding to said problem management server owner designation parameter;
responsive to determining by said event synchronizer that said received event report does not contain a problem management server owner designation parameter, selecting a primary problem management server owner value and a secondary problem management server owner value for said event report according to a rules base, and modifying said event report to include two problem management server owner designation parameters according to said primary owner value and to said secondary owner value; and
transmitting by said event synchronizer said modified event report in real-time directly to said primary problem management server and to said secondary problem management server corresponding to said added problem management server owner designation parameters without requiring said event report to be stored in a database disposed between said event synchronizer and said primary and secondary problem management servers, without delay of database synchronization, and without waiting for a request for said event from either said primary or said secondary problem management server.

2. The method as set forth in claim 1 wherein said receiving an event report comprises intercepting an event report from a networked resource directed to an automated problem diagnosis and resolution tool.

3. The method as set forth in claim 1 wherein said receiving an event report comprises receiving an event report transmitted from a networked resource directed to an automated problem diagnosis and resolution tool.

4. The method as set forth in claim 1 wherein said determining that said received event report contains an owner designation parameter comprises determining that an automated problem diagnosis tool event report contains an owner field.

5. The method as set forth in claim 1 wherein said selecting an owner value comprises making a logical selection according to a rules base defined by automated problem diagnosis tool.

6. The method as set forth in claim 1 wherein said modifying said event report comprises modifying an automated problem diagnosis tool event report.

7. The method as set forth in claim 1 wherein said transmitting said modified event report comprises transmitting the modified event report to an automated problem diagnosis tool.

8. The method as set forth in claim 1 wherein said receiving an event report comprises intercepting event reports on a first communication network, and wherein said transmitting said modified event report comprises transmitting said modified event report to a local problem management server and to one or more alternate problem management servers on a second communication network, thereby reducing traffic flow of event reports on said first network.

9. The method as set forth in claim 8 wherein said transmitting on a first communication network comprises transmitting on a lower level of a hierarchically organized network, and wherein said step of transmitting on a second communication network comprises transmitting on a top level of said hierarchically organized network.

10. The method as set forth in claim 8 wherein said transmitting on a second network comprises transmitting on a secure communication network, thereby increasing the security and reliability of event report handling.

11. The method as set forth in claim 1 wherein modifying said event report comprises modifying said event report to include a primary owner designation parameter and a secondary owner designation parameter.

12. The method as set forth in claim 1 wherein:
said receiving an event report further comprises receiving one or more modified event reports from one or more event busses; and
said determining that said event report does not contain an owner designation comprises examining said received modified event report for a primary owner designation parameter and a secondary owner designation parameter, and forwarding said modified event report to a problem management server corresponding to said secondary owner designation in the situation wherein a primary owner problem management server has failed to respond or is known to be otherwise indisposed to handle said event report.

13. A computer program product comprising:
a computer readable storage memory device suitable for encoding computer programs; and
one or more computer programs encoded by said computer readable storage memory device, when executed by a processor:
receiving into a computer storage memory device by an event synchronizer an event report from an event source in a computing environment of managed networked computers, said event report having a series of digital values representing binary, text, or character parameters for a reported network computing enterprise single failure event;
responsive to determining by said event synchronizer that said event report contains a problem management server owner designation parameter, transmitting said received event report without modification to a local problem management server corresponding to said problem management server owner designation parameter;
responsive to determining by said event synchronizer that said received event report does not contain a problem management server owner designation parameter, selecting a primary problem management server owner value and a secondary problem management server owner value for said event report according to a rules base, and modifying said event report into a computer storage memory device to include two problem management server owner designation parameters according to said primary owner value and to said secondary owner value; and
transmitting by said event synchronizer said modified event report in real-time directly to said primary problem management server and to said secondary problem management server corresponding to said added problem management server owner designation parameters without requiring said event report to be stored in a database disposed between said event synchronizer and said primary and secondary problem management servers, without delay of database synchronization, and without waiting for a request for said event from either said primary or said secondary problem management server.

14. The computer program product as set forth in claim 13 wherein said receiving an event report comprises intercepting an event report from a networked resource directed to an automated problem diagnosis and resolution tool.

15. The computer program product as set forth in claim 13 wherein said receiving an event report comprises receiving an event report transmitted from a networked resource directed to an automated problem diagnosis and resolution tool.

16. The computer program product as set forth in claim 13 wherein said determining that said received event report contains an owner designation parameter comprises determining that an automated problem diagnosis tool event report contains an owner field.

17. The computer program product as set forth in claim 13 wherein said modifying said event report comprises modifying an automated problem diagnosis tool event report.

18. The computer program product as set forth in claim 13 wherein said transmitting said modified event report comprises transmitting the modified event report to an automated problem diagnosis tool.

19. The computer program product as set forth in claim 13 wherein said receiving an event report comprises intercepting event reports on a first communication network, and wherein said transmitting said modified event report comprises transmitting said modified event report to a local problem management server and to one or more alternate problem management servers on a second communication network, thereby reducing traffic flow of event reports on said first network.

20. The computer program product as set forth in claim 19 wherein said transmitting on a first communication network comprises transmitting on a lower level of a hierarchically organized network, and wherein said transmitting on a second communication network comprises transmitting on a top level of said hierarchically organized network.

21. The computer program product as set forth in claim 19 wherein said transmitting on a second network comprises transmitting on a secure communication network, thereby increasing the security and reliability of event report handling.

22. The computer program product as set forth in claim 13 wherein modifying said event report comprises modifying said event report to include a primary owner designation parameter and a secondary owner designation parameter.

23. The computer program product as set forth in claim 13 wherein:
said receiving an event report further comprises receiving one or more modified event reports from one or more event busses; and
said determining that said event report does not contain an owner designation comprises examining said received modified event report for a primary owner designation parameter and a secondary owner designation parameter, and forwarding said modified event report to a problem management server corresponding to said secondary owner designation in the situation wherein a primary owner problem management server has failed to respond or is known to be otherwise indisposed to handle said event report.

24. A system comprising:
a computing platform having a hardware means for performing a logical process;
an event synchronizer portion of said computing platform:
receiving into a computer storage memory device an event report from an event source in a computing environment of managed networked computers, said event report having a series of digital values representing binary, text, or character parameters for a reported network computing enterprise single failure event,
determine that said received event report does or does not contain a problem management server owner designation parameter, responsive to determining a problem management server owner designation parameter is not contained in said received event report:
selects a primary problem management server owner value and a
secondary problem management server owner value for said event report according to a rules base, and
modifies said event report in a computer storage memory device to include two problem management server owner designation parameters according to said primary owner value and to said secondary owner value; and
a transmitter portion of said computing platform which transmits said modified event report in real-time directly to said primary problem management server and to said secondary problem management server corresponding to said added problem management server owner designation parameters without requiring said event report to be stored in a database disposed between said event synchronizer and said primary and secondary problem management servers, without delay of database synchronization, and without waiting for a request for said event from either said primary or said secondary problem management server.

25. The system as set forth in claim 24 wherein said receiving an event report comprises intercepting an event report from a networked resource directed to an automated problem diagnosis and resolution tool.

26. The system as set forth in claim 24 wherein said receiving an event report comprises receiving an event report transmitted from a networked resource directed to an automated problem diagnosis and resolution tool.

27. The system as set forth in claim 24 wherein said determining that said received event report does not contain an owner designation parameter comprises determining that an automated problem diagnosis tool event report does not contain an owner field.

28. The system as set forth in claim 24 wherein said selecting an owner value comprises making a logical selection according to a rules base defined by automated problem diagnosis tool.

29. The system as set forth in claim 24 wherein said modifying said event report comprises modifying an automated problem diagnosis tool event report.

30. The system as set forth in claim 24 wherein said transmitter transmits the modified event report to an automated problem diagnosis tool.

31. The system as set forth in claim 24 wherein said receiver intercepts event reports on a first communication network, and wherein said transmitter transmits said modified event report to a local problem management server and to one or more alternate problem management servers on a second communication network, thereby reducing traffic flow of event reports on said
first network.

32. The system as set forth in claim 31 wherein said transmitting on a first communication network comprises transmitting on a lower level of a hierarchically organized network, and wherein said transmitting on a second communication network comprises transmitting on a top level of said hierarchically organized network.

33. The system as set forth in claim 31 wherein said transmitting on a second network comprises transmitting on a secure communication network, thereby increasing the security and reliability of event report handling.

34. The system as set forth in claim 24 wherein modifying said event report comprises modifying said event report to include a primary owner designation parameter and a secondary owner designation parameter.

35. The system as set forth in claim 24 wherein:
said receiver receives one or more modified event reports from one or more event busses; and
said event synchronizer forwards said modified event report to a problem management server corresponding to said secondary owner designation in a situation wherein a primary owner problem management server has failed to respond or is known to be otherwise indisposed to handle said event report.

36. The computer program product as set forth in claim 13 wherein said selecting an owner value comprises making a logical selection according to a rules base defined by automated problem diagnosis tool.

* * * * *